United States Patent
Micke et al.

(10) Patent No.: US 8,535,612 B2
(45) Date of Patent: Sep. 17, 2013

(54) DIESEL PARTICLE FILTER WITH A CERAMIC FILTER BODY

(75) Inventors: Michael Micke, Stuttgart (DE); Sabine Otterbach, Tamm (DE)

(73) Assignee: Mann + Hummel GmbH, Ludwigsburg (DE)

( * ) Notice: Subject to any disclaimer, the term of this patent is extended or adjusted under 35 U.S.C. 154(b) by 909 days.

(21) Appl. No.: 12/530,153

(22) PCT Filed: Mar. 3, 2008

(86) PCT No.: PCT/EP2008/052579
§ 371 (c)(1),
(2), (4) Date: Jan. 22, 2010

(87) PCT Pub. No.: WO2008/107423
PCT Pub. Date: Sep. 12, 2008

(65) Prior Publication Data
US 2010/0129271 A1    May 27, 2010

(30) Foreign Application Priority Data
Mar. 8, 2007    (DE) .......................... 10 2007 011 569

(51) Int. Cl.
*B01D 50/00*    (2006.01)
(52) U.S. Cl.
USPC .......................................... 422/180; 422/177
(58) Field of Classification Search
USPC ......... 422/177, 180; 55/523, 385.3; 428/116
See application file for complete search history.

(56) References Cited

U.S. PATENT DOCUMENTS

| 6,776,814 B2 * | 8/2004 | Badeau et al. ............... 55/385.3 |
| 2003/0190269 A1 | 10/2003 | Liu |
| 2005/0079111 A1 | 4/2005 | Gaiser |
| 2007/0186911 A1 | 8/2007 | Gerlach |
| 2008/0034719 A1 * | 2/2008 | Han et al. ......................... 55/524 |
| 2008/0141638 A1 | 6/2008 | Linhart |
| 2009/0246098 A1 * | 10/2009 | Endo et al. .................... 422/180 |

FOREIGN PATENT DOCUMENTS

| EP | 1522686 | 4/2005 |
| EP | 1930060 | 6/2008 |
| WO | WO2006005668 | 1/2006 |

OTHER PUBLICATIONS

WIPO search report for international application PCT/EP2008/052579.

* cited by examiner

Primary Examiner — Tom Duong
(74) Attorney, Agent, or Firm — James Hasselbeck (57) ABSTRACT

Disclosed is a diesel particle filter with a ceramic filter body and a method for producing the filter body. The ceramic filter body includes gas channels provided in a filter section with planar and porous filter walls. The filter walls provide throughflow of the exhaust gas flow perpendicular to the surfaces thereof. The filter body includes at least one catalytic section for catalytic purification of the exhaust gas flow. The filter body together with the filter section and the at least one ceramic section are made in one-piece from at least one ceramic impregnated fiber web. Gas channels are formed by sintering the fiber web at a temperature such that fibers of the fiber material are burned away and the ceramic material is monolithically sinter-bonded in one-piece with the at least one catalytic section and the filter section to produce the filter body.

17 Claims, 4 Drawing Sheets

DIESEL PARTICLE FILTER WITH A CERAMIC FILTER BODY

CROSS REFERENCE TO RELATED APPLICATIONS

This application is US National Stage Entry of international patent application no. PCT/EP2008/052579, filed Mar. 3, 2008 designating the United States of America, the entire disclosure of which is incorporated herein by reference. Priority is claimed based on Federal Republic of Germany patent application no. 10 2007 011 569.7, filed Mar. 8, 2007.

TECHNICAL FIELD

The invention concerns a diesel particle filter with a ceramic filter body with the features according to the preamble of claim 1 as well as a method for producing a corresponding ceramic filter body.

PRIOR ART

DE 35 01 182 A1 discloses an exhaust gas filter for diesel engines. The ceramic filter bodies disclosed therein have layered areal and porous filter walls between which gas passages are formed. The gas passages are closed off alternatingly. An exhaust gas flow that enters at one end the gas passages open at this end is forced by the closure plugs to flow through the porous filter walls transversely to their surfaces. The exhaust gas passages at the opposite side are open in the outflow direction and release the filtered exhaust gas flow.

No information is provided in regard to how the ceramic filter bodies disclosed therein are produced. Geometrically comparable bodies as they are known, for example, in connection with exhaust gas catalysts are produced by extrusion. This requires a high tool expenditure for the molding step. The degrees of freedom with regard to shaping of the filter body and in particular the filter walls as well as the gas passages is limited by the extrusion process. Providing a flow-optimal configuration of the diesel particle filter is difficult.

WO 2006/005668 A1 discloses a ceramic exhaust gas filter for internal combustion engines whose filter body is formed of ceramically impregnated paper. One flat and one corrugated impregnated paper web are layered to form a semi-finished product with formation of gas passages and are then wound to a coil body. The corrugations of the corrugated paper web have a constant shape across their entire length so that the gas passages in the direction of their length also have a constant cross-section. For a transverse flow through the passage walls the flow passages are alternatingly closed off by means of plugs. At the inlet side and at the outlet side of the diesel particle filter only one half of the entire cross-section of the ceramic filter body is available for intake and outflow. Efficiency and construction volume of the illustrated arrangement can therefore be improved upon.

The invention has the object to develop a diesel particle filter of the aforementioned kind such that with minimal space requirements an improved exhaust gas aftertreatment is made possible.

This object is solved by a diesel particle filter with the features of claim 1.

The invention has furthermore the object to provide a method with which a compact and efficient ceramic filter body can be produced in a simple way.

This object is solved by a method with the features of claim 12.

SUMMARY OF THE INVENTION

A diesel particle filter is proposed in which the filter body, in addition to the filter section, has at least one catalytic section for catalytic purification of the exhaust gas flow, wherein the filter body together with the filter section and the at least one catalytic section is of a one-piece configuration of at least one ceramically impregnated fiber web, in particular paper, with formation of gas passages and is formed by sintering at a temperature such that fibers of the fiber material are burned off and that the ceramic material with formation of the filter body with the at least one catalytic section and the filter section is sinter-bonded monolithically as one piece.

In a corresponding manufacturing method with simple means a one-piece monolithic filter body is produced in which a catalytic and a mechanically filtering exhaust gas aftertreatment are combined. The arrangement is space-saving and can be produced in a simple way. The filter section directly adjoining the at least one catalytic section reduces the flow resistance and improves the efficiency of the exhaust gas treatment.

A catalytic section at the inlet side has advantageously a catalytic coating in the form of an oxidizing catalyst coating for reducing the CO or HC contents in the exhaust gas stream. Alternatively or in combination therewith a catalytic section at the outlet side has expediently a catalytic coating in particular in the form of an NOX-storing coating. With only a single one-piece filter body a complete exhaust gas aftertreatment can be realized. Nitrogen oxides (NOX) contained in the exhaust gas flow are stored for a certain operating time in the NOX-storing coating without reaching the ambient with the exhaust gas flow. In certain temporal intervals, a regeneration of the storage coating can be realized, for example, by a short-term operation with excessively rich fuel/air mixture and a resulting desorption and reduction. In place of the embodiment as an NOX-storing catalyst a configuration as SCR catalyst can be expedient also.

A further advantageous option resides in that the filter section has a catalytic coating for reducing the ignition temperature of particles retained in the gas-permeable filter walls. At an appropriate level of soiling of the filter walls, the filter body can be operated optionally at moderately increased temperature, so that as a results of this the embedded filtered-out particles are combusted. The service life of the filter body is thus almost unlimited.

In a preferred embodiment, neighboring gas passages are alternatingly closed off at an inlet side of the filter section and at an outlet side of the filter section by closure plugs, in particular made from ceramic material, wherein the filter section relative to the longitudinal direction of the gas passages is positioned between the closure plugs and wherein the at least one catalytic section relative to the longitudinal direction is positioned outside of the filter section that is delimited by the closure plugs.

In an advantageous embodiment, the gas passages are interrupted between the filter section and the catalytic section by formation of a transverse flow section. The gas passages of the catalytic section in this connection are not blocked by the closure plugs and can all be flown through with utilization of the entire available catalytic surface. The transverse flow section prevents backing-up caused by the closure plugs of the filter section within the catalytic section at the inlet side. By creation of a transverse flow, a catalytic section at the outlet side can be freely entered. By a suitable configuration of the transverse flow section, a desired turbulence as well as a proper intake flow from the catalytic section into the filter section as well as outflow out of the filter section into the downstream catalytic section can be realized.

Expediently, between two flat fiber webs at least two corrugated fiber webs are arranged at a spacing relative to one another in the longitudinal direction wherein a first corrugated fiber web together with the two flat fiber webs forms the gas passages of the catalytic section, wherein the second corrugated fiber web together with the same continuous and flat fiber webs forms the gas passages of the filter section, and wherein the spacing between the at least two corrugated fiber webs forms the transverse flow section. Simply by the spatial separation or spacing of the two corrugated fiber webs, the intermediate transverse flow section interposed in the flow direction or in the longitudinal direction can be produced. Deformation, cutting, perforations or the like can be carried out but are not necessarily required. The separate configuration of the two fiber webs enables easily different geometric configurations as well as the use of different materials. The flow conditions can be optimized with minimal manufacturing expenditure.

In a preferred embodiment the corrugated fiber web of the catalytic section relative to the corrugated fiber web of the filter section has a deviating wavelength, in particular a reduced wavelength, and/or a deviating wave shape. The reduced wavelength in the catalytic section increases the number of correlated gas passages and thus the catalytically active surface. The catalytic section can therefore be designed to be of a correspondingly space-saving configuration.

In an expedient embodiment, for the formation of the gas passages of the catalytic section at least two corrugated fiber webs are stacked on top one another between the two flat fiber webs, in particular with interposition of an additional flat fiber web. Two or more layers of catalytic gas passages are produced whose total height advantageously corresponds to the height of the correlated gas passages of the filter section. In this way, there remains the possibility, despite several layers of catalytic gas passages, to form a coil body that is constant with respect to the cross-section and is approximately cylindrical. The number of catalytic gas passages and the catalytically active surface area that is made available in this way are further increased. Additional possibilities for flow optimization and resistance optimization are provided.

In particular, the walls of the gas passages that are formed by ceramically impregnated fiber webs have in the area of the at least one catalytic section openings that connect the gas passages at this location in a flow-conducting way to one another. In this way, in the inlet or outlet area of the filter body the complete passage cross-section of all gas passages can be utilized so that the inlet and outlet conditions are improved as a result of reduced flow resistance and/or by targeted turbulence. The flow cross-sections of gas passages are utilized also which, without such openings, would be excluded from being flown through because of the closure plugs.

Expediently both types of neighboring gas passages, i.e., those that are ending at the end face of the filter section at the respective closure plugs and those that extend into the interior of the filter section are provided with a catalytic coating. The openings that are provided here and the resulting transverse flow bring the exhaust flow in contact with the walls of all gas passages. With utilization of the entire flow cross-section of the filter body, the catalytic coating can act on the exhaust gas flow. As a whole, only a minimal cross-section of the filter body is required in order to obtain the desired purification action with minimal flow-through resistance.

In an advantageous embodiment, the openings in the filter body are formed in that sections of the at least one fiber web are excluded from ceramic impregnation. For this purpose, the not yet impregnated fiber material can be provided with cutouts in which the fiber web cannot take up any ceramic material. Alternatively or additionally, it can be expedient to apply the ceramic material onto the at least one fiber web only partially so that sections of the fiber web are produced that are excluded from ceramic impregnation. A further advantageous possibility resides in applying materials onto the at least one fiber web that prevent the ceramic impregnation. For this purpose, application of a suitable glue such as hot melt or epoxy resin or the like can be advantageous. In the aforementioned way a selective or partial ceramic impregnation that predetermines the configuration of the future filter body can be realized with simple means. The cellulose fibers or other suitable fibers of the fiber web are combusted during sintering. The fiber sections without impregnation and the cutouts in the fiber web leave behind openings and outer contours in the desired shape, number and position. Almost any geometric configuration of the filter body can be realized in a simple way.

In an advantageous further embodiment, the filter section and the catalytic section are impregnated such with the ceramic material that in the filter section and in the catalytic section after the sintering process different porosities are generated in the ceramic material. In this way, the porosity in the filter section can be adjusted to the desired filtering action while the porosity of the catalytic section can be matched independent of the filter section in such a way that the exhaust gas flow will come into contact with a sufficiently large catalytically active surface area.

BRIEF DESCRIPTION OF THE DRAWINGS

Embodiments of the invention will be explained in the following with the aid of the drawing in more detail. It is shown in.

EMBODIMENT(S) OF THE INVENTION

Figure 1:
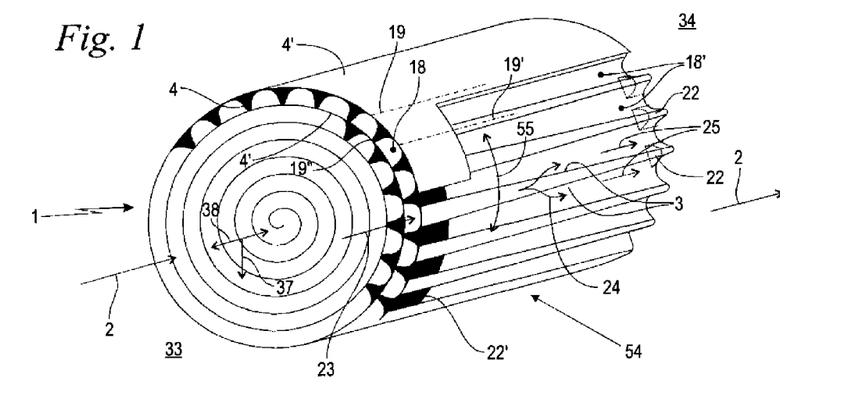
FIG. 1 in a schematic perspective illustration a filter section of a ceramic filter body according to the invention of ceramically impregnated wound fiber webs.
Figure 2:
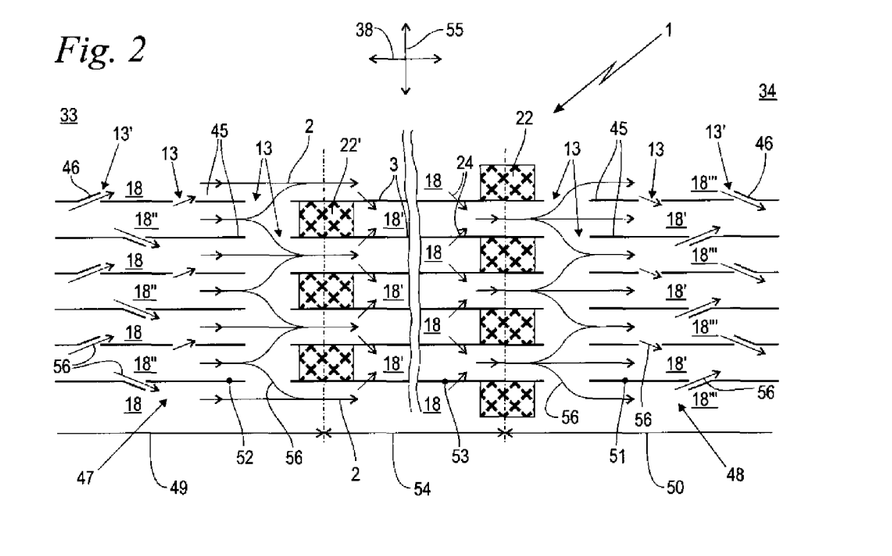
FIG. 2 a schematic longitudinal illustration of neighboring gas passages with intermediately positioned openings for unimpaired gas exchange in the catalytic turbulence sections of the ceramic filter body according to the invention.

FIG. 1 shows in schematic, partially sectioned perspective illustration a ceramic filter body 1 according to the invention in the area of its filter section 54. The filter section 54 is part of a filter body 1 that is schematically illustrated in FIG. 2 that, in turn, is part of a diesel particle filter, not illustrated in detail, for filtering an exhaust gas flow 2 of a diesel engine. The filter body 1 is formed of ceramically impregnated fiber webs 4, 4' which will be explained in detail infra in connection with FIGS. 3 to 6. The fiber webs 4, 4' are joined in accordance with the illustration of FIGS. 3 to 5 to a semi-finished product 17 which is wound to form the approximately cylindrically embodied filter body 1 according to FIG. 1. By winding the ceramically impregnated fiber webs 4, 4' to a coil body, a layering direction results that is identical to a radial direction 37 of the cylindrical filter body 1. Alternatively, it can also be expedient to arrange several corrugated fiber webs 4 or semi-finished products 17 (FIGS. 4 to 6) in a plane and to layer them on top one another like a stack.

Flow of the exhaust gas flow 2 through the filter body 1 in an axial direction 38 of the filter body 1 from the inlet side 33 to the outlet side 34 is provided. For this purpose, the first fiber web 4 is of a corrugated configuration while the second fiber web 4' is substantially flat. The selected term of corrugation includes waves with rounded, for example, sinus-shaped cross-section, but also those with angular, for example, triangular, rectangular, or trapezoidal cross-section. As a result of the stacked or coiled structure, relative to the radial direction 37 of the filter body 1 a corrugated fiber web 4 and a flat fiber web 4' are resting alternatingly atop one another. The corrugated fiber web 4 is connected with the second flat fiber web 4' along a plurality of contact lines 19, 19', 19" that extend at least approximately parallel to one another. As a result of the wave shape of the fiber web 4, the flat shape of the further fiber web 4'*m* and the coil structure, a plurality of at least approximately axis-parallel extending gas passages 18, 18' having in the axial direction 38 a constant height measured in the radial direction 37 are provided. In a circumferential direction 55 of the filter body 2, a gas passage 18 and a gas message 18', respectively, are provided alternatingly. The gas passages 18 are open toward the inlet side 33 and in the opposite direction toward the outlet side 34 are closed by means of closure plugs 22. Relative to the circumferential direction 55 between two gas passages 18 one gas passage 18' is positioned, respectively, that relative to the inlet side 33 is closed off by means of a closure plug 22' and relative to the outlet side 34 is open. In operation the exhaust gas flow 2 flows in accordance with arrow 23 axis parallel into the gas passages 18 that are open toward the inlet side 33. Sidewalls of the ceramic structure arranged in the circumferential direction 55 and formed by the corrugated fiber web 4 provide areal and porous filter walls 3. The exhaust gas flow 2 that is backed up at the closure plugs 22 is deflected in the circumferential direction 55 in accordance with the arrows 24 and flows through the porous ceramic filter walls 3 transversely to their surface. In accordance with arrows 24 the exhaust gas flow 2 passes through the filter walls 3 into the passages 18 that are open toward the outlet side 34 and flows out of them in accordance with arrows 25. When passing through the porous filter walls 3 the exhaust gas flow 2 is purified by removing entrained soot particles or the like.

FIG. 2 shows a perspective longitudinal section illustration of a filter body 1 embodied according to the invention with a centrally positioned filter section 54 and two turbulence sections 49, 50 that in the longitudinal direction 38 adjoin at the two ends, respectively. In the turbulence section 49 at the inlet side gas passages 18, 18" adjoin one another alternatingly in the circumferential direction 55 and in the turbulence section 50 at the outlet side gas passages 18' 18''' adjoin one another alternatingly. In the central filter section 54 relative to the circumferential direction 55 gas passages 18, 18' are arranged alternatingly adjacent to one another. The gas passages 18 are closed off at the outlet side 34 of the filter sections 54 by closure plugs 22 while the gas passages 18' at the outlet side are closed off by closure plugs 22' at the inlet side 33 of the filter section 54. The gas passages 18" of the turbulence section 49 at the inlet side are separated by closure plugs 22' from the gas passages 18' at the outlet side that are aligned therewith in the longitudinal direction while the gas passages 18 at the inlet side are separated by closure plugs 22 from the gas passages 18''' of the turbulence section 50 at the outlet side that are aligned therewith in the longitudinal direction. The filter body 1 according to FIG. 2 that is illustrated in schematic section illustration in the longitudinal direction 38 and in the circumferential direction 55 is wound including its two turbulence sections 49, 50 in accordance with the filter section 54 according to FIG. 1 to an approximately cylindrical shape but can also be of a stacked arrangement.

Relative to the longitudinal direction 38 the filter section 54 is positioned between the closure plugs 22, 22' while the two turbulence sections 49, 50 relative to the longitudinal direction 38 are positioned outside of the filter section 54 or outside of the closure plugs 22, 22'. In the turbulence section 49 at the inlet side the gas passages 18, 18' neighboring one another in the circumferential direction 55 are separated from one another by walls 45 while in the turbulence section 50 at the outlet side the gas passages 18', 18''' are also separated from one another by walls 45. In both turbulence sections 49, 50 the walls 45 formed by the fiber web 4 (FIG. 1) have a number of openings 13, 13' that connect the gas passages 18, 18" and the gas passages 18', 18''' fluidically with one another. For demonstrating different options that can be realized individually or in combination with one another, some of the openings 13 are embodied as a simple cutout in the walls 45 while others of the openings 13' are provided with flow-deflecting tabs 46. The tabs 46 are stamped partially or cut out partially from the fiber webs 4, 4' to be described in the following in more detail and bent out of the plane of the respective fiber web 4, 4'. As a result of their ceramic impregnation and the final sintering process that will be described infra in more detail the fiber material of the fiber web 4, 4' (FIG. 1) will burn off so that the tabs 46 remain in a purely ceramic form.

As a result of the openings 13, 13', optionally flow-conductingly enhanced by the tabs 46, a turbulent gas exchange between the neighboring gas passages 18, 18" in the turbulence section 49 at the inlet side and between the neighboring gas passages 18', 18''' in the turbulence section 50 at the outlet side is realized in the following way. The exhaust gas flow 2 illustrated in FIG. 1 flows into the filter body 1 not only through the gas passages 18 at the inlet side but also through the gas passages 18" ending at the closure lugs 22'. The proportion of the exhaust gas flow at the gas passages 18" at the inlet side is backed up at the closure plugs 22' and is deflected through the openings 13, 13' into the neighboring gas passages 18 at the inlet side. Despite the backing-up action of the closure plugs 22' not only the flow cross-section of gas passages 18 at the inlet side is available but also that of the gas passages 18" at the inlet side in the turbulence section 49. Accordingly, in the turbulence section 49 at the inlet side two types of inlet-side gas passages 18, 18" are present. The first type is constituted by the gas passages 18 that extend past the closure plugs 22' into the filter section 54 and end at the closure plugs 22 at the outlet side. The second type is constituted by the gas passages 18" at the inlet side that end at the inlet side of the filter section 54 at the closure plugs 22 and that transfer their proportion of the exhaust gas flow by means of the openings 13, 13' to the neighboring gas passages 18.

The turbulence section 49 at the inlet side is optionally formed as a catalytic section 47 in which both types of the neighboring gas passages 18, 18" have at their inner walls a catalytic coating, for example, in the form of an oxidizing catalyst coating 52 for reducing the CO or HC contents in the exhaust gas flow 2. The exhaust gas flow 2 that is catalytically after-treated in this way passes through the gas passages 18 into the filter section 54 where, as a result of the backing-up action of the closure plugs 22, it is forced through the filter walls 3 in accordance with arrows 24 and exits into the neighboring gas passages 18' at the outlet side.

The turbulence section 50 at the outlet side has two types of gas passages 18', 18'''. The first type is constituted by the gas passages 18' at the outlet side that begin downstream of the closure plugs 22' and extended through the filter section 54 as well as also through the turbulence section 50 at the outlet side toward the outlet side 34. The second type is formed by the gas passages 18''' at the outlet side that extend downstream of the filter section 54 and its closure plugs 22 at the outlet side only within the turbulent section 50 at the outlet side. In order to utilize also the flow cross-section of gas passages 18''' at the inlet side that are separated by the closure plugs 22, the openings 13, 13', optionally in connection with the tabs 46, are provided so that a flow exchange of the gas passages 18' at the outlet side with the further gas passages 18''' is realized.

The turbulence section 50 at the outlet side is embodied as a catalytic section 48 at the outlet side. In this connection, both types of neighboring gas passages 18', 18" have a catalytic coating on their inner walls in the form of an NOX-storing coating 51. In this way, the entire inner surface of the gas passages 18' and also of the gas passages 18''' is catalytically active. In place of the NOX-storing catalyst a deviating configuration, for example, in the form of an SCR catalyst can be expedient. In this connection, the addition of urea is to be provided.

Optionally, the filter walls 3 of the filter section 54 also have a catalytic coating 53 for reducing the ignition temperature of particles that are retained by the gas-permeable filter walls 3. At an appropriate level of soiling of the filter walls 3, the filter body 3 can be operated optionally at moderately increased temperature so that the embedded particles that have been filtered out are combusted.

Figure 3:
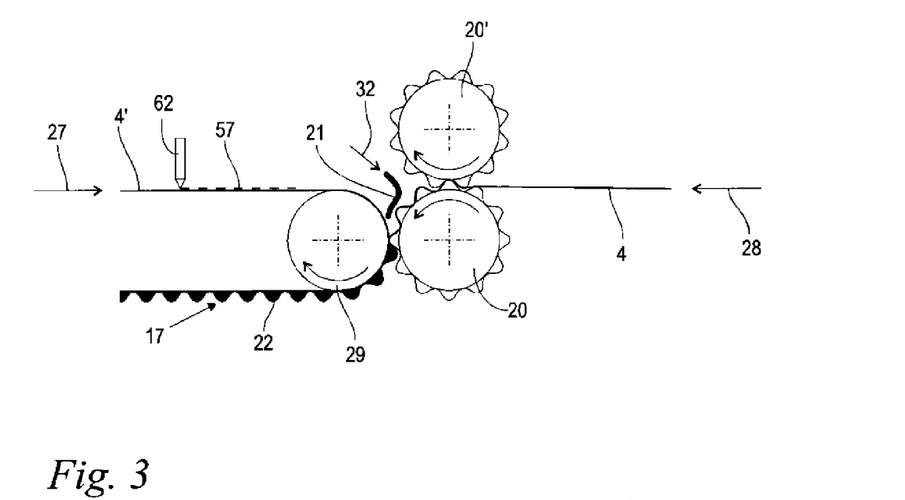
FIG. 3 a schematic illustration of a rolling device for shaping and joining the fiber webs to a semi-finished product.
Figure 4:
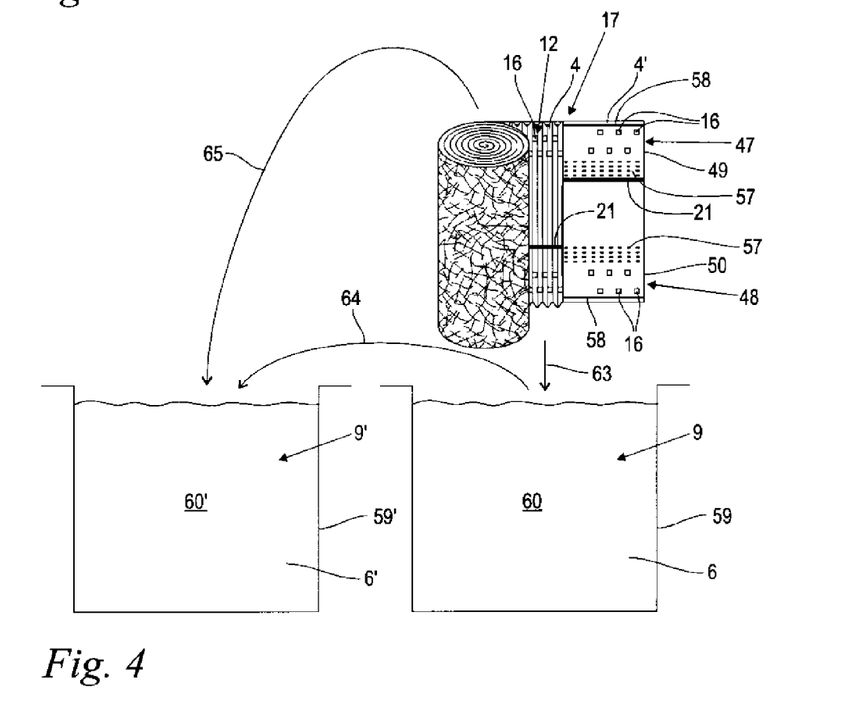
FIG. 4 a blank formed of the semi-finished product according to FIG. 3 during ceramic impregnation in an immersion bath.

FIG. 3 shows in a schematic view a device for producing a semi-finished product 17 that, in turn, can be used for producing a blank for the filter body 1 according to FIGS. 1 and 2 in accordance with the illustration of FIG. 4. A first initially flat fiber web 4 is supplied in accordance with arrow 28 to a pair of corrugated rollers 20, 20' whose corrugations mesh with one another. The fiber web 4 is passed through the meshing corrugations so that it is imparted with a corrugated shape. A further flat fiber web 4' is supplied in accordance with arrow 27 to the device and deflected by means of pressing roller 29. In this way, the flat fiber web 4' is pressed against the corrugated fiber web 4. A bead 21 of ceramic material that is introduced in accordance with arrow 32 in between the webs forms later on the closure plugs 22' in accordance with the illustration of FIGS. 1 and 2. By means of a schematically shown device 62 an adhesive for forming an interrupted trail of adhesive 57 is dripped onto the flat fiber web 4' so that the two fiber webs 4, 4' will later on adhere to one another. The trail of adhesive 57 will be explained in more detail infra in connection with FIG. 4.

FIG. 4 shows a not yet completely wound blank produced from the semi-finished product 17 according to FIG. 3 for forming the filter body 1 according to FIGS. 1 and 2. In the catalytic sections 47, 48 or in the turbulence sections 49, 50 the fiber web 4 and/or the fiber web 4' is provided with cutouts 16 that later on during sintering form the openings 13 illustrated in FIG. 2. Moreover, a material is supplied in strips in order to prevent the future ceramic impregnation of the fiber web 4, 4'. This can be a suitable, in particular organic, adhesive such as a hot melt, an epoxy resin or the like. In the illustrated embodiment, for this purpose different parallel extending interrupted trails of adhesive 57 are provided by means of which the two fiber webs 4, 4' adhere to one another. The interrupted trails of adhesive 57 can be produced, for example, by dripping adhesive onto the fiber web 4' in accordance with the illustration of FIG. 3. In place of the trails of adhesive 57, or in addition to, also adhesives, impregnation agents or the like can be applied in a similar way that, like the trails of adhesive 57, prevent ceramic impregnation without however having adhesive properties. The flat fiber web 4' is provided at its two longitudinal edges also with a further trail of adhesive 58 that however serves only for simplified production of the semi-finished product 17 and that when producing the blank will be cut off in a way not illustrated here. Between the corrugated fiber web 4 and the flat fiber web 4' there is also the bead 21 according to FIG. 3 for forming the closure plugs 22' (FIG. 1). On the side of the corrugated fiber web 4 that is facing away from the flat fiber web 4', adjacent to the neighboring turbulence sections 50 a further bead 21 of ceramic material is applied that upon winding the semi-finished product 17 to the illustrated blank forms the future closure plugs 22 (FIG. 1) at the outlet side.

Subsequent to the winding of the blank or alternatively after forming a stack, the blank in accordance with arrow 63 is transferred to a container 59 with an immersion bath 60. The immersion bath 600 contains an emulsion 9 with ceramic material 6. The blank of the fiber body 1 (FIGS. 1, 2) that is formed of the fiber webs 4, 4' is soaked or impregnated with the ceramic material 6. The impregnation can be enhanced by applying a vacuum. However, only a partial impregnation results because the cutouts 16 and the trails of adhesive 57 cause ceramically unimpregnated sections 12 that are illustrated in a comparable way in FIG. 6.

As needed, one or several additional containers 59' with immersion baths 60' can be made available. The immersion bath 60' that is illustrated as an example contains a ceramic emulsion 9' that with regard to its properties deviates from the ceramic emulsion 9 of the immersion bath 60. In this way, the catalytic sections 47, 48 and the filter section 54 can be provided with different ceramic structures. By alternative immersion of the filter blank into one of the two immersion baths 60, 60' in accordance with arrows 63, 65 or sequential, optionally partial, immersion of the filter blank in both immersion baths 60, 60' in accordance with arrows 63, 64, areas with different ceramic impregnation are formed. It is, for example, possible to first impregnate the blank as a whole in the immersion bath 60 in accordance with arrow 63. Subsequently, an additional impregnation of the two catalytic sections 47, 48 by partial immersion of the two ends of the blank into the immersion bath 60' (arrow 64, 65) can be realized. In an embodiment with only one catalytic section 47, 48, first only the filter section 54 can be inserted into the immersion bath 60 (arrow 63) and, subsequently, after turning the blank, immersion of the catalytic section 47 (arrow 65) can be carried out. In this way, the filter section 54 and the catalytic section 47, 48 can be impregnated with ceramic material 6, 6' in such a way that in the filter section 54 and in the catalytic sections 47, 48 by means of the sintering process different porosities of the sintered ceramic material are produced. The porosity of the filter section 54 can be adjusted to optimal filtering action while independent of this the porosity of the catalytic sections 47, 48 can be adjusted with respect to optimization of the catalytically active surface area.

The two immersion baths 60, 60' may contain ceramic emulsions 9, 9' with particles of the same ceramic material but of different particle size. Since the areas infiltrated therewith are not precisely separated from one another, a more or less fluid transition between both areas of different porosity exists which is advantageous in regard to thermal and mechanical resistance. As an alternative or in addition to the different particle size of the ceramic emulsions 9, 9', a different ceramic material can be selected also.

A further option for obtaining areas with different porosity resides in the use of fiber webs 4, 4' with different structures within the width of the web. For example, when producing the fiber webs 4, 4' of filter paper, a fiber pulp of different fiber length, fiber geometry and/or fiber concentrations can be used so that within the filter paper areas with varying properties in a direction transverse to the web direction can be adjusted. Even in case of ceramic impregnation with only one immersion bath 60 the fibers that are combusted during sintering leave behind areas with different porosity.

It can also be expedient to provide the not yet ceramically impregnated fiber webs 4, 4' or the blank according to FIG. 4 first with a suitable coating that has an advantageous effect on the formation of a pore structure. The coating can be of inorganic or organic nature and, as needed, may enhance or reduce the ceramic impregnation in order to achieve different impregnation areas. In the case of an organic coating, such coating can contribute to a targeted formation of cavities during the sintering process.

The blank of the filter body 1 (FIGS. 1, 2) that is formed in this way is subsequently sintered by heat exposure wherein the filter body 1 including the filter section 54, the turbulent section 40, 50, and the closure plugs 22, 22' (FIG. 2) is produced monolithically as one piece. Fibers that are not impregnated, for example, in the area of the trails of adhesive 57, 58, will combust in this connection approximately without leaving any residue and leave behind openings 13 in accordance with the illustration of FIG. 2.

The filter body 1 that after the sintering process is hard and porous is subsequently immersed section-wise with its catalytic section 47, 48 and/or its filter section 54 into one or several suspensions, not illustrated, for example, of catalytically active particles or molecules such as Pt or Pd, so that the aforementioned coatings 52, 53, 54 are produced. Optionally, the process may be enhanced e.g. by vacuum. In this connection, as a coating technique all conventional methods as, for example, sol-gel technique or the application of a so-called wash coat, can be employed. The coated component is subsequently dried and subjected to a heat treatment.

Inasmuch as not described differently, the embodiment according to FIGS. 3 and 4 with regard to its features and reference numerals is identical to the embodiments that will be explained in the following in connection with FIGS. 5, 6 and 7, 8.

Figure 5:
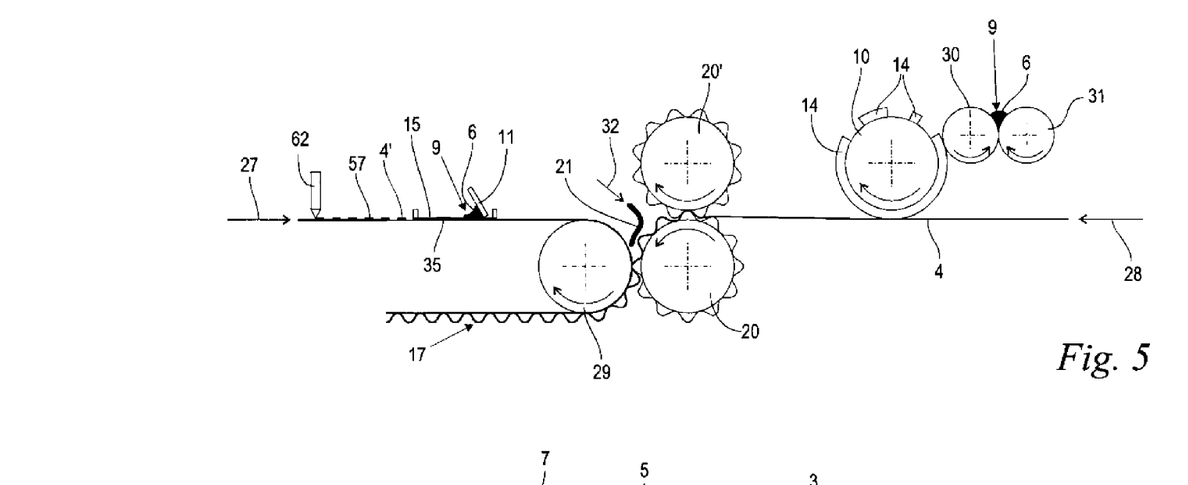
FIG. 5 a schematic illustration of a rolling and coating device for impregnation of fiber webs with ceramic material as well as for shaping and joining to a semi-finished product.

FIG. 5 shows a schematic illustration of a further device for producing the filter body 1 (FIGS. 1, 2) according to the invention. Two feed rollers 30, 31 of the device are arranged axis-parallel to one another and are positioned flush adjacent to one another. They rotate in opposite direction wherein in a wedge-shaped intermediate space above their contact line a ceramic material 6 is stored. The ceramic material 6 can be a dry powder of finely ground ceramic material provided for dry impregnation of the fiber web 4. In the illustrated embodiment, the ceramic material 6 has been made into an aqueous emulsion 9. Instead of water, also another suitable liquid or a liquid mixture can be expedient. As a ceramic material 6 preferably aluminum oxide, cordierite, mullite, silicon carbide and/or aluminum titanate, each alone or also in various combinations with one another, can be employed. A further roller 10 is arranged axis-parallel to the feed rollers 30 and contacts it along a contact line. The feed roller 30 supports as a result of its rotation indicated by an arrow the ceramic emulsion 9 to the roller 10 and rolls the ceramic emulsion 9 onto the surface of the roller 10. By means of the roller 10 the ceramic material 6 is then rolled into the material of the fiber web 4 which is guided underneath in the direction of the arrow 20. For this purpose, the roller 10 rests with pressure against the fiber web 4. The impregnation of the fiber web 4 with the emulsion 9 is performed. The areal permeable fiber web 4 takes up the finely ground ceramic material 6 within its entire cross-section.

The endless fiber web 4 passes subsequently in the direction of the arrow 28 two meshing rollers 20, 20' that are arranged axis-parallel to one another so that the fiber web 4 impregnated with the ceramic material 6 is provided with a corrugated shape. The corrugations of the corrugated rollers 20, 20' are embodied alternatingly approximately conically so that the corrugations of the fiber web 4 in accordance with the illustration of FIG. 1 are alternatingly conical, i.e., provided with cross-sections that in the direction of flow are widening or narrowing. The two corrugated rollers 20, 20' are heated. This leads to a slight drying but not a complete drying throughout the corrugated fiber web 4 impregnated with the emulsion 9 so that the waveshape is stabilized.

A further fiber web 4' is supplied in opposite direction in accordance with arrow 27 to the illustrated device and moves about a pressure roller 29. Relative to the movement direction indicated by arrow 27 in front of the pressure roller 29 there is a screen 15 resting on the fiber web 4'. Above the screen 15 there is also an aqueous emulsion 9 with the ceramic material 6 stored on the screen. The emulsion 9 is applied by means of a doctor blade 11 with application of pressure through the screen into the material of the fiber web 4' so that impregnation of the fiber web 4' with the emulsion 9 is realized. Alternatively, a dry impregnation of the fiber web 4' with the ceramic material 6 can be carried out. It can also be expedient to provide impregnation of the fiber web 4' with a roller arrangement 10, 30, 31 in accordance with the oppositely positioned fiber web 4. Also, for the corrugated fiber web 4 an impregnation by means of screen 15 and doctor blade 11 may be expedient.

The pressure roller 29 is positioned against the lower corrugated roller 20. As a result of the opposite rotational direction of the pressure roller 29 and of the corrugated roller 20 the flat fiber web 4' and the corrugated fiber web 4 are pressed against one another and connected to one another. In the direction of passage the semi-finished product 17 is produced behind the roller arrangement 29, 20.

A blank of the filter body 1 (FIGS. 1, 2) is formed from the semi-finished product 17 by winding or stacking. With simultaneous reference to FIG. 1 it can be seen that the corrugated fiber web 4 with its peaks rests against the flat fiber web 4', positioned above and indicated in dashed lines, along the contact lines 19, 19' and is connected thereto along the contact lines 19, 19'. The connection can be realized by a suitable glue. In the illustrated embodiment the connection is produced by the ceramic emulsion 9 in the fiber webs 4, 4'. It can also be expedient to apply along the contact lines 19, 19' additional ceramic emulsion 9, optionally in thickened form, in order to achieve a connection of the two fiber webs 4, 4'. In the connected state of the semi-finished product 17 by means of the corrugated structure of the fiber web 4 and the flat shape of the fiber web 4' the future gas passages 18, 18', 18'', 18'''

(FIG. 2) are pre-shaped wherein sidewalls of the corrugated fiber web 4 in the filter section 54 are provided for the formation of the future filter walls 3.

After impregnation in accordance with FIG. 5, the semi-finished product 17 impregnated with the ceramic emulsion 9 is wound in the wet state, i.e., emulsion 9 is not yet completely dried, into the shape of the future filter body 1 according to FIG. 1 or is stacked and subsequently dried. Upon winding or stacking the troughs of the corrugated fiber web 4 are connected along the contact lines 19" to the flat fiber web 4' positioned underneath so that, in addition to the gas passages 18, also additional gas passages 18' are closed in the radial direction 37 and in the circumferential direction 55 of the approximately cylindrical filter body 1 (FIG. 1). The connection at the contact lines 19" is realized in the same way as at the contact lines 19, 19'.

The filter blank which is formed in this way is sintered after the drying process in a sintering furnace under the action of heat wherein the ceramic material 6 is sinter-bonded to a monolithic ceramic body. At the high sintering temperature the material of the fiber webs 4, 4' will be combusted so that a certain porosity of the ceramic material 6 is achieved. The porosity is designed such that the exhaust gas flow 2 (FIGS. 1, 2) can flow through the ceramic filter walls 3 transverse to the surface of the filter walls.

The cross-section of the gas passages 18, 18' changes in the axial direction 38 in such a way that the cross-sections of the gas passages 18 at the inlet side narrow in a direction from the inlet side 33 toward the outlet side 34. In the other direction, the cross-sections of the gas passages 18' at the outlet side widen in the direction from the inlet side 33 toward the outlet side 34 wherein however for all gas passages 18, 18' the passage height remains constant. This is achieved by a corrugation of the fiber web 4 with wide peaks at the inlet side 33 and narrow peaks at the outlet side 34. In the illustrated embodiment according to FIG. 1 the width of the peaks decreases linearly from the inlet side 33 to the outlet side 34. As a result of the constant passage height and a uni-dimensional approximately conical curvature of the fiber web 4 also the cross-sectional course is approximately linear. However, also a deviating non-linear course in particular by a multi-dimensional spatial curvature of the fiber web 4 can be expedient. Alternatively, also a configuration of the corrugations can be advantageous in which the gas passages 18, 18' from the inlet side 33 toward the outlet side 34 have a constant cross-section as is the case in the embodiment according to FIG. 2.

The exhaust gas flow 2 which enters the gas passages 18 in the direction of arrows 23 penetrates in accordance with the illustration of FIG. 1 along the entire length of the gas passages 18, 18' within the filter section 54 through the filter walls 3 in accordance with arrows 24. In this way, the volume flow 23 at the inlet side in the gas passages 18 decreases across the length while the volume flow 25 at the outlet side in the gas passage 18' increases in the direction of length. The afore described cross-sectional course of the gas passages 18, 18' has the result that the flow velocity within the gas passages 18, 18' as well as the pressure difference measured across the filter walls 3 between the gas passages 18, 18' across the length are at least approximately constant. The filtration load of the filter walls 3 is thus at least approximately constant in the direction of length of the gas passages 18, 18'.

Figure 6:
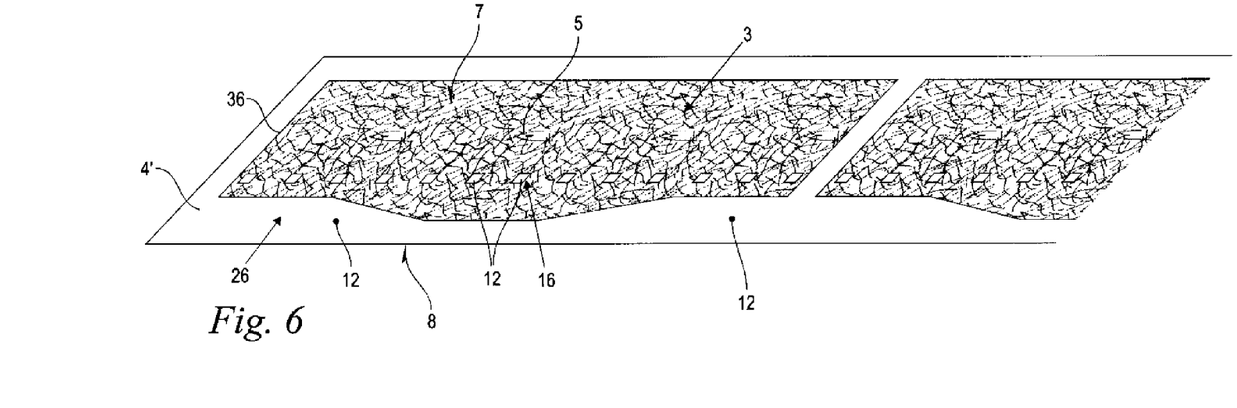
FIG. 6 a schematic perspective illustration of a fiber web that has been partially impregnated with the arrangement according to FIG. 5 and is provided with cutouts.

FIG. 6 shows in a perspective schematic illustration the endless fiber web 4'. The following description applies in the same sense also to the additional fiber web 4 (FIG. 5). The fiber webs 4, 4' are comprised of fibers 5. They may be in the form of a felt, a textile woven material or nonwoven material.

Preferred is an open permeable filter paper, particularly of cellulose fibers. The fiber web 4' is areal and permeable in the sense that the finely ground ceramic material 6 (FIG. 5) can penetrate between the fibers 5 of the fiber web 4. The permeability of the fiber web 4 and the impregnation process according to FIG. 5 are matched to one another in such a way that a part of the fibers 5 after impregnation with the ceramic material 6 (FIG. 5) are exposed at both oppositely positioned surfaces 7, 8 of the fiber web 4. This causes upon burning off the fibers 5 during the sintering process the sintered ceramic filter walls 3 to be continuously porous from one surface 7 to the oppositely positioned surfaces 8 and to be gas-permeable for the exhaust gas flow 2 (FIG. 1) in a direction transverse to the surface of the filter walls 3.

In certain areas it can be expedient to provide at least section-wise a deviating porosity. For example, the filter body 1 (FIG. 1) in the area of the flat fiber web 4' can have such a minimal porosity that in the technical sense of the filtration process it is practically gas-impermeable while a significant gas permeability is desirable only in the area of the corrugated fiber web 4. In this case, in addition to the impregnation of the fiber web 4' by soaking, also a closed surface coating with the ceramic material 6 (FIG. 5) on at least one of the two surfaces 7, 8 is provided without there being any exposed fibers 5. In this case, the sintering action produces a closed ceramic body which in the area of the surface 7, 8 is hardly porous and thus in the technical sense is gas-impermeable. This can be expedient, for example, for the flat fiber web 4 in the filter section 54 (FIG. 1) in order to effect a controlled gas throughput through the porous filter walls 3 of the corrugated fiber web 4. Moreover, a section-wise varying porosity can be adjusted as is disclosed in connection with FIGS. 3 and 4 in order to adjust in the filter section 54 and in the catalytic section 47, 48 (FIG. 2) by the sintering process a different porosity of the sintered ceramic material 6.

It can be expedient to impregnate the fiber webs 4, 4' as an uncut endless material across the entire surface area with the ceramic material 6 (FIG. 5). Unimpregnated sections 12 can be produced, for example, by stamping out cutouts 16 for future formation of openings 13 (FIG. 2) or by cutting a contoured sheet material 36 at its edge area 26. In the illustrated embodiment according to FIG. 6 unimpregnated sections 12 are provided that are excluded selectively from impregnation with the ceramic material 6; only a partial ceramic impregnation of the fiber webs 4, 4' is carried out. A part of the non-impregnated sections 12 is excluded from impregnation for the future configuration of the openings 13 (FIG. 2). A further non-impregnated section 12 is formed by the edge area 26 which surrounds the contoured sheet material 36. The contoured sheet material 36 has a contour that is required for winding the filter body 1 according to FIGS. 1, 2. The sheet material 36 can be produced by tailoring the fiber web 4 in particular by stamping the circumferential contour of the sheet material 36 as well as by stamping out the cutouts 16. It can also be expedient to not employ stamping of the cutouts 16 and to simply exclude the correlated sections 12 from impregnation with a ceramic material 6 (FIG. 5). This is done in a way to be described infra in more detail. Moreover, the tabs 46 illustrated in FIG. 2 can be stamped partially and can be bent out of the plane of the fiber web 4, 4' in order to generate openings 13' according to FIG. 2. Alternatively or additionally it can be expedient to apply a material that prevents ceramic impregnation of the section 12, comparable, for example, to the trails of adhesive 57, 58 according to FIG. 4.

The fiber webs 4, 4' that are impregnated only section-wise and/or are tailored are joined in the afore described way to the semi-finished product 17 which subsequently is formed to the blank of the filter body 1 according to FIGS. 1, 2. The impregnated areas of the fiber webs 4, 4' have the shape of the filter body 1 to be formed (FIGS. 1, 2). In the subsequent sintering process the sections 12 that are not tailored and not impregnated will be combusted completely and leave behind the filter body 1 in its form provided in FIGS. 1 and 2, including the openings 13, 13', tabs 46, and closure plugs 22, 22' (FIG. 2) as a one-piece monolithic body.

The illustration according to FIG. 5 shows that the roller 10 has a surface structure 14. It corresponds in its shape to the contour of the sheet material 36 according to FIG. 6. The ceramic emulsion 9 is rolled only by the projecting surfaces of the surface structure 14 under pressure into the fiber web 4. In intermediately positioned areas of the surface structure 14 that are recessed in the radial direction no impregnation with the ceramic material 6 can take place so that the fiber web 4 in analogy to the fiber web 4' of FIG. 6 can be impregnated with the ceramic material 6 only partially and with formation of the non-impregnated sections 12.

An alternative form of production of non-impregnated sections 12 in the fiber web 4' results from the illustration according to FIG. 5 in the area of the screen 15. The screen 15 is comparable to the screen printing method with schematically indicated covers 35. The covers 35 correspond in their contour to the shape of the sections 12 according to FIG. 6 that are not impregnated. Upon application of the ceramic emulsion 9 under pressure by means of the doctor blade 11 the covers 35, optionally also the stamped-out portions or cutouts 16 (FIG. 6), prevented partially impregnation and form the non-impregnated sections 12. A further alternative or additional option resides according to FIG. 5 in that by means of the device 62 trails of adhesive 57 or materials preventing the ceramic impregnation are applied which materials with their properties and actions correspond to the trails of adhesive 57 or the material applications according to FIGS. 3 and 4.

The illustration according to FIG. 5 also shows that before joining the two fiber webs 4, 4' beads 21 of ceramic material are applied onto the corrugated fiber web 4 in accordance with an arrow 32. The ceramic beads 21 are squeezed between the two fiber webs 4, 4' and form later the closure plugs 22 according to FIGS. 1 and 2. In analogy to the illustration of FIG. 4, a further bead 21 is applied onto the semi-finished product 17 in order to generate upon winding or stacking of the blank (FIG. 4) the additional closure plugs 22 (FIGS. 1, 2). For the alternating arrangement of the closure plugs 22, 22' according to FIG. 1, it can be expedient to apply the beads 21 in an interrupted fashion. For certain applications it can also be expedient to arrange the closure plugs 22, 22' in the circumferential direction continuously wherein then also the correlated beads 21 are applied continuously. The beads 21 are comprised in FIGS. 3, 4, and 5 of a wet soft ceramic material and are dried together with the fiber webs 4, 4' and subsequently sintered so that a monolithic ceramic filter body 1 according to FIGS. 1 and 2 is produced.

Figure 7:
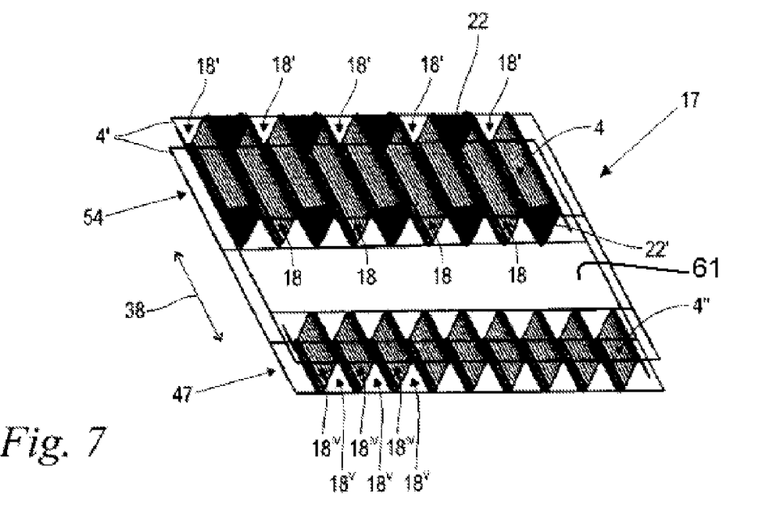
FIG. 7 a schematic perspective illustration of a semi-finished product for forming the filter body according to the invention with separate corrugated fiber webs in the catalytic section and in the filter section and with an intermediately positioned transverse flow section.

FIG. 7 shows a further embodiment of the semi-finished product 17 according to the invention with a filter section 54 and a catalytic section 47 that in the flow direction is upstream of the filter section 54. From the semi-finished product 17 a filter blank is produced in the same way and from it a filter body 1 as has been explained in connection with FIGS. 1 through 6. For the formation of gas passages 18, 18' of the filter section 54 between two flat fiber webs 4' a corrugated fiber web 4 is arranged. Closure plugs 22, 22' that are alternatingly arranged in the troughs of the corrugated fiber web 4 close off the gas passages 18 at the inlet side and the gas passages 18' at the outlet side in a comparable way as in the illustration according to FIGS. 1 and 2. In deviation from the illustration according to FIG. 1 the closure plugs 22, 22' are arranged such on the surface of the corrugated fiber web 4 that only in every other trough a closure plug 22 at the outlet side or a closure plug 22' at the inlet side is arranged. At the bottom side of the corrugated fiber web 4 there are also corresponding closure plugs arranged in the troughs, but they are not shown to facilitate the illustration. In contrast to the embodiment of FIG. 1 the gas passages 18 at the inlet side and the gas passages 18' at the outlet side are produced at the topside as well as at the bottom side of the corrugated fiber web 4 and are delimited upwardly and downwardly by the adjoining flat fiber web 4', respectively. The gas passages 18, 18' with the closure plugs 22, 22' may also be embodied in accordance with the illustration of FIG. 1.

Separate from the corrugated fiber web 4 of the filter section 54 a further corrugated fiber web 4" is provided and arranged in the longitudinal direction 38 at a spacing to the corrugated fiber web 4 of the filter section 54. The corrugated fiber web 4" is secured between the same continuously extending flat fiber webs 4' acting as a covering layer as the corrugated fiber web 4 and forms gas passages $18^{IV}$, $18^{V}$ of the catalytic section 47. In the transverse flow section 61 the gas passages 18, 18', $18^{IV}$, $18^{V}$, in deviation from the illustration according to FIGS. 1 and 2, are not continuous but interrupted. The gas passages $18^{IV}$, $18^{V}$ end together with the correlated corrugated fiber web 4" at the inlet side of the transverse flow section 61 while the gas passages 18, 18' of the filter section 54 begin together with the correlated corrugated fiber web 4 downstream of the transverse flow section 61. The gas passages $18^{IV}$, $18^{V}$ have no closure plugs and can thus be flown through with utilization of the entire available component cross-section by the incoming exhaust gas flow while for the flow into the downstream filter section 54 only half of the entire cross-section, i.e., in the form of the gas passages 18 at the inlet side, is available.

For a proper uninterrupted transfer of the gas stream from the catalytically coated gas passages $18^{IV}$, $18^{V}$ past the closure plugs 22, 22' into the gas passages 18 of the filter section 54 at the inlet side, a free area without corrugated fiber web is provided within the space between the corrugated fiber web 4" and the corrugated fiber web 4. As a result of this free area a transverse flow section 61 is formed which in the vertical direction, like the catalytic section 47 and the filter section 54, is delimited by the, as a whole, uninterrupted continuous flat fiber webs 4'. The transverse flow section 61 is not only flown though in the longitudinal direction 38. Because no corrugated fiber web is present, moreover transversely to the longitudinal direction 38 in the plane of the semi-finished product 17 a partial transverse flow can be formed so that a proper transfer of the flow from the catalytic section 47 into the filter section 54 is effected. For further improvement of the transverse flow it may be additionally expedient to provide openings 13 in the corrugated fiber web 4" of the catalytic section 47 in accordance with the illustration of FIG. 2. Moreover, it may be advantageous to provide alternatively or additionally a further catalytic section 48 (FIG. 2) downstream of the filter section 54 wherein between the catalytic section 48 and the filter section 54 a transverse flow section 61 is arranged in an analogous way.

The production of the semi-finished product 17 and the ceramic impregnation can be realized in the same way as disclosed in connection with FIGS. 1 to 6. The separate configuration of the corrugated fiber webs 4, 4' allows in addition the use of different paper or fiber types. Moreover, in deviation from the illustration according to FIG. 7 in which the two fiber webs 4, 4" have the same wavelength and same wave shape, also different wavelengths and wave shapes can be chosen. In particular, it is possible to configure the corrugated fiber web 4' of the catalytic section 47 with a wavelength that in comparison to the filter section 54 is shortened so that an increased number of gas passages $18^{IV}$, $18^V$ with a correspondingly enlarged catalytically active surface area will result. The wave height of both corrugated fiber webs 4, 4" is however preferably of the same size so that in the longitudinal direction 38 a constant spacing between the two fiber webs 4' that act as cover layers will result. This enables, as desired, the formation of an at least approximately cylindrical coil body with a constant diameter in the longitudinal direction 38 or the formation of a stacked body with a constant height in the longitudinal direction 38.

Figure 8:
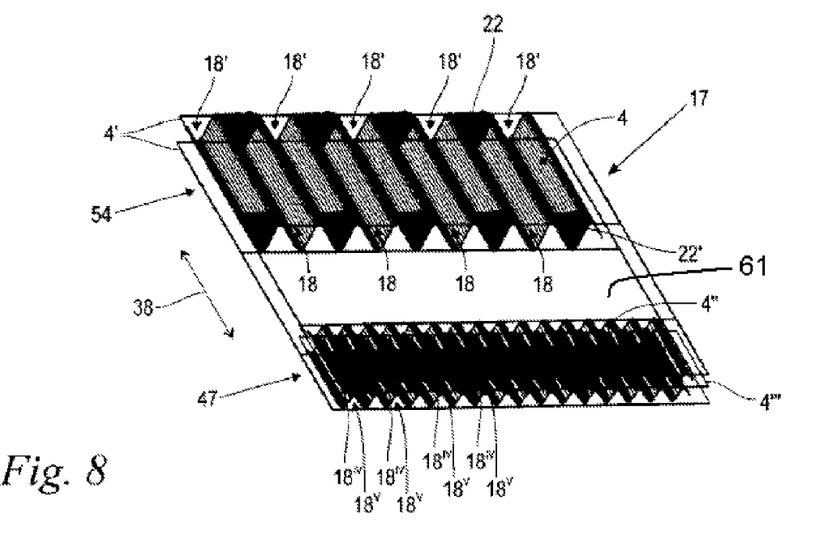
FIG. 8 a variant of the arrangement according to FIG. 7 with two corrugated fiber webs stacked on top one another in the area of the catalytic section for forming an increased number of catalytic gas passages.

FIG. 8 shows a variant of the arrangement according to FIG. 7 in which the filter section 54 is embodied identical to the embodiment of FIG. 7. In the catalytic section 47 a total of two corrugated fiber webs 4' are however stacked with interposition of a further flat fiber web 4''' and arranged between the two fiber webs 4' that act as cover layers. It is also possible to stack three or more corrugated fiber webs 4' to a package with interposition of a further flat fiber web 4''', respectively, and to arrange them between the flat fiber webs 4'. Optionally, the interposition of the further flat fiber web 4''' can be eliminated.

The corrugated fiber webs have in comparison to the corrugated fiber web 4 of the filter section 54 a reduced wavelength as well as a reduced wave height. In this way, in comparison to the embodiment of FIG. 7 a significantly increased number of gas passages $18^{IV}$, $18^V$ of the catalytic section 47 with overall significantly increased catalytically active surface area will result. In order to maintain a constant height, comparable to the embodiment according to FIG. 7, in the longitudinal direction 38 between the two flat fiber webs 4', the total height of gas passages $18^{IV}$, $18^V$ between the flat fiber webs 4' is identical to the height of gas passages 18, 18' of the filter section 54. In the illustrated embodiment, both layers of gas passages $18^{IV}$, $18^V$ are identically embodied so that their individual height is half the height of the gas passages 18, 18'. In this connection, in addition to a deviating wavelength a deviating wave shape in comparison to the corrugated fiber web 4 of the filter section 54 can be chosen also. With regard to other features and reference numerals, the embodiment of FIG. 8 corresponds to that of FIG. 7.

The invention claimed is:

1. Diesel particle filter, comprising
a ceramic filter body of a ceramic material for filtering an exhaust gas flow of a diesel engine,
wherein the filter body has gas passages that are provided in a filter section with areal and porous filter walls,
wherein the filter walls are configured to allow passage of the exhaust gas flow transversely to their surface, characterized in that
the filter body in addition to the filter section has at least one catalytic section for catalytic purification of the exhaust gas flow,
wherein a traverse flow section is arranged between and separating said at least one catalytic section and said filter section,
wherein said gas passages of the filter section end at a first side of said traverse flow section,
wherein gas passages of said at least one catalytic section end at an opposing second side of said traverse flow section,
wherein said gas passages are formed by corrugated fiber webs,
wherein said traverse flow section is a free area without said corrugated fiber web, said free area open to flow in a traverse direction relative to a longitudinal direction of said gas passages,
wherein the walls of the gas passages that are formed by the ceramically impregnated fiber web are provided in the area of the at least one catalytic section with openings that fluidically connect the gas passages with one another,
wherein a ceramic flow deflecting tab is formed at an opening in the gas passage wall of the ceramically impregnated fiber web, the flow deflecting tab bent out of plane of the fiber web wall to protrude into the gas passage, said opening having said ceramic flow deflecting tab connecting fluidically with an adjacent gas passage,
wherein the filter body together with the filter section and the at least one catalytic section is formed as one piece of at least one ceramically impregnated fiber web, in particular paper, with formation of the gas passages and
is formed by sintering at a temperature such that fibers of the fiber material are burned off and
that the ceramic material under formation of the filter body with the at least one catalytic section and the filter section is sinter-bonded as one piece monolithically.

2. Diesel particle filter according to claim 1, characterized in that
the catalytic section at the inlet side has a catalytic coating in the form of an oxidizing catalyst coating for reducing the CO or HC contents in the exhaust gas flow.

3. Diesel particle filter according to claim 1, characterized in that
a catalytic section at the outlet side has a catalytic coating, in particular in the form of an NOX-storing coating.

4. Diesel particle filter according to claim 1, characterized in that
the filter section has a catalytic coating for reducing the ignition temperature of particles retained by the gas-permeable filter walls.

5. Diesel particle filter according to claim 1, characterized in that
neighboring gas passages are alternatingly closed off at an inlet side of the filter section and an outlet side of the filter section by closure plugs, in particular of ceramic material,
wherein the filter section relative to a longitudinal direction of the gas passages is positioned between the closure plugs and
wherein the at least one catalytic section relative to the longitudinal direction is positioned outside of the filter section delimited by the closure plugs.

6. Diesel particle filter according to claim 1, characterized in that
the gas passages between the filter section and the catalytic section are interrupted with formation of a transverse flow section.

7. Diesel particle filter according to claim 6, characterized in that
between two flat fiber webs at least two corrugated fiber webs are arranged at a spacing relative to one another in the longitudinal direction,
wherein the corrugated fiber webs together with the two flat fiber webs form the gas passages of the catalytic section,
wherein the corrugated fiber webs together with the two flat fiber webs form the gas passages of the filter section, and
wherein the spacing between the at least two corrugated fiber webs forms the transverse flow section.

8. Diesel particle filter according to claim 7, characterized in that
the corrugated fiber web of the catalytic section has a wave length that deviates from the fiber web of the filter section in particular is reduced relative thereto, and/or has a deviating wave shape.

9. Diesel particle filter according to claim 7, characterized in that
for formation of the gas passages of the catalytic section at least two corrugated fiber webs are stacked on top one another between the two flat fiber webs, in particular with interposition of a further flat fiber web.

10. Diesel particle filter according to claim 1, characterized in that
in the area of the at least one catalytic section provided with openings both types of neighboring gas passages have a catalytic coating.

11. Method for producing a ceramic filter body with a plurality of gas passages for filtering an exhaust gas flow of a diesel engine, wherein the filter body has at least one catalytic section for catalytic purification of the exhaust gas flow and as well a filter section with areal and porous filter walls that are designed for passage of the exhaust gas flow transverse to the surface of the filter walls,
wherein a traverse flow section is arranged between and separating said at least one catalytic section and said filter section,
wherein said gas passages of the filter section end at a first side of said traverse flow section,
wherein gas passages of said at least one catalytic section end at an opposing second side of said traverse flow section,
wherein said gas passages are formed by corrugated fiber webs,
wherein said traverse flow section is a free area without said corrugated fiber web, said free area open to flow in a traverse direction relative to a longitudinal direction of said gas passages,
wherein the walls of the gas passages that are formed by the ceramically impregnated fiber web are provided in the area of the at least one catalytic section with openings that fluidically connect the gas passages with one another,
wherein a ceramic flow deflecting tab is formed at an opening in the gas passage wall of the ceramically impregnated fiber web, the flow deflecting tab bent out of plane of the fiber web wall to protrude into the gas passage, said opening having said ceramic flow deflecting tab connecting fluidically with an adjacent gas passage, comprising the following method steps:
at least one areal permeable fiber web of filter paper is impregnated with finely ground ceramic material in particular in such a way that a part of the fibers of the fiber web is exposed at both surfaces;
the fiber web is brought into a future shape of the filter body;
the fiber web filled with the ceramic material and shaped is sintered at a temperature such that the fibers of the fiber web are burned off and that the ceramic material with formation of the filter body with the at least one catalytic section and the filter section is sinter-bonded as one piece monolithically.

12. Method according to claim 11, characterized in that
between two flat fiber webs at least two corrugated fiber webs are arranged in the longitudinal direction at a spacing to one another, wherein the corrugated fiber web together with the two flat fiber webs forms the gas passages of the catalytic section, wherein the corrugated fiber web together with the two flat fiber webs forms the gas passages of the filter section, and wherein the spacing between the at least two corrugated fiber webs forms the transverse flow section.

13. Method according to claim 12, characterized in that
the sections of at least one fiber web for the formation of openings in the filter body are excluded from ceramic impregnation.

14. Method according to claim 13, characterized in that
at least one fiber web for formation of the sections that are to be excluded from ceramic impregnation are provided with cutouts.

15. Method according to claim 13, characterized in that
the ceramic material is applied only partially onto the at least one fiber web for forming the sections to be excluded from ceramic impregnation.

16. Method according to claim 13, characterized in that
at least one fiber web for formation of the sections to be excluded from ceramic impregnation are provided with material applications that prevent ceramic impregnation.

17. Method according to claim 13, characterized in that
the filter section and the catalytic section are impregnated with the ceramic material in such a way that in the filter section and in the catalytic section a different porosity of the sintered ceramic material is produced by the sintering process.

* * * * *